United States Patent
Altman

(10) Patent No.: US 7,836,171 B2
(45) Date of Patent: Nov. 16, 2010

(54) COMMUNICATION LINK INTERCEPTION USING LINK FINGERPRINT ANALYSIS

(75) Inventor: Yuval Altman, Herzliya (IL)

(73) Assignee: Verint Americas Inc., Roswell, GA (US)

( * ) Notice: Subject to any disclaimer, the term of this patent is extended or adjusted under 35 U.S.C. 154(b) by 893 days.

(21) Appl. No.: 11/729,185

(22) Filed: Mar. 27, 2007

(65) Prior Publication Data

US 2008/0239976 A1      Oct. 2, 2008

(51) Int. Cl.
    *G06F 15/16* (2006.01)
(52) U.S. Cl. .................................. 709/224; 726/22
(58) Field of Classification Search ................ 709/223, 709/224; 726/22
    See application file for complete search history.

(56) References Cited

U.S. PATENT DOCUMENTS

| | | | |
|---|---|---|---|
| 6,684,247 B1 * | 1/2004 | Santos et al. | 709/224 |
| 6,915,123 B1 | 7/2005 | Daudelin et al. | |
| 6,931,433 B1 | 8/2005 | Ralston et al. | |
| 2005/0273612 A1 | 12/2005 | Van Der Veen et al. | |

OTHER PUBLICATIONS www.verint.com/communications_interception.
www.netoptics.com.

* cited by examiner

*Primary Examiner*—David Lazaro
(74) *Attorney, Agent, or Firm*—Lawrence A. Aaronson, P.C.

(57) ABSTRACT

A method for monitoring communication includes intercepting one or more communication links, which are part of a communication system that includes a plurality of the communication links. Data content that is carried by the one or more communication links is decoded. First and second mathematical fingerprints related to the one or more intercepted communication links are computed by evaluating statistical characteristics of the data content decoded from the one or more communication links. The first and second fingerprints are compared to produce a matching result, and a predefined action is performed with respect to the one or more communication links responsively to the matching result.

19 Claims, 3 Drawing Sheets

COMMUNICATION LINK INTERCEPTION USING LINK FINGERPRINT ANALYSIS

FIELD OF THE INVENTION

The present invention relates generally to communication links, and particularly to methods and systems for identifying and tracking communication links.

BACKGROUND OF THE INVENTION

Several methods and systems for intercepting communication links and for analyzing information extracted from communication links are known in the art. Such methods and systems are used by a variety of organizations, such as intelligence agencies, law enforcement agencies and communication service providers. For example, Verint® Systems Inc. (Melville, N.Y.) offers several systems and solutions for intercepting, filtering and analyzing voice and data, wireline and wireless, cable and satellite, Internet, multimedia, and Voice over IP communication links. Details regarding these products can be found at www.verint.com/communications_interception.

SUMMARY OF THE INVENTION

Embodiments of the present invention provide a computer-implemented method for monitoring communication, including:

intercepting one or more communication links, which are part of a communication system that includes a plurality of the communication links, and decoding data content carried by the one or more communication links;

computing first and second mathematical fingerprints related to the one or more intercepted communication links by evaluating statistical characteristics of the data content decoded from the one or more communication links;

comparing the first and second fingerprints to produce a matching result; and performing a predefined action with respect to the one or more communication links responsively to the matching result.

In some embodiments, intercepting the one or more communication links includes monitoring first and second resources of the communication system used by respective first and second communication links during respective first and second different time intervals, computing the first and second fingerprints includes evaluating first and second statistical characteristics of first and second data content decoded from the first and second communication links during the first and second time intervals, and comparing the first and second fingerprints includes detecting that the first communication link switched from the first resource to the second resource between the first time interval and the second time interval to form the second communication link. In a disclosed embodiment, performing the predefined action includes continuing to intercept the second communication link by monitoring the second resource.

In another embodiment, intercepting the one or more communication links includes monitoring a resource of the communication system used by one of the communication links, computing the first and second fingerprints includes evaluating first and second statistical characteristics of first and second data content decoded from the communication link during first and second different time intervals, and comparing the first and second fingerprints includes automatically detecting that the communication link stopped using the monitored resource during the second time interval.

In yet another embodiment, intercepting the one or more communication links includes monitoring at least one physical resource of the communication system selected from a group of physical resource types consisting of a satellite, a satellite transponder, a base station, a frequency channel, a trunk, an optical fiber, a wire connection and a wireless point-to-point link. Additionally or alternatively, intercepting the one or more communication links may include monitoring at least one logical resource of the communication system selected from a group of logical resource types consisting of a port, a slot allocation in a physical trunk, a Virtual Private Network (VPN) a Virtual Local Area Network (VLAN) and a routing path.

In still another embodiment, intercepting the one or more communication links includes intercepting a first communication link, computing the first fingerprint includes evaluating the statistical characteristics of the data content decoded from the first communication link, intercepting the one or more communication links and computing and comparing the first and second fingerprints include searching the plurality of the communication links and identifying a second communication link that is related to the first communication link, and performing the predefined action includes outputting an indication of the identified second communication link.

In an embodiment, the first and second communication links include respective first and second opposite directions of a bidirectional communication link. In an alternative embodiment, the first and second communication links include parallel links that transfer data of a single communication connection over different communication resources.

In another embodiment, computing the first and second fingerprints includes evaluating the first and second fingerprints at respective first and second different points in time, and comparing the first and second fingerprints includes detecting a change in the one or more communication links that occurred between the first and second points in time.

In yet another embodiment, the second fingerprint represents a predefined link profile, and comparing the first and second fingerprints includes determining whether the intercepted communication links match the predefined link profile. The predefined link profile may characterize an entity that operates the intercepted communication links.

In some embodiments, intercepting the one or more communication links includes storing the data content exchanged over the intercepted links, and computing the first and second fingerprints includes processing the stored data content. In another embodiment, performing the predefined action includes triggering an alert to a user.

Comparing the first and second fingerprints typically includes quantifying a similarity between the first and second fingerprints. Comparing the first and second fingerprints may include comparing the quantified similarity to a threshold. In an embodiment, the first and second fingerprints include respective first and second vectors whose elements include first and second values of the statistical characteristics, and quantifying the similarity includes calculating a distance metric between the first and second vectors.

Calculating the distance metric may include calculating a distance vector whose elements indicate similarities between the respective elements of the first and second vectors, and processing the elements of the distance vector to produce the distance metric. In some embodiments, processing the elements of the distance vector includes weighting the elements of the distance vector using respective weights and summing the weighted elements.

In an embodiment, the statistical characteristics include at least one characteristic type selected from a group of types consisting of performance attributes of the communication links, characteristics of applications served by the communication links and characteristics related to identities of users of the communication links. In another embodiment, one of the statistical characteristics includes a variation of another of the statistical characteristics over time.

There is additionally provided, in accordance with an embodiment of the present invention, a communication monitoring apparatus, including:

a receiver, which is arranged to intercept one or more communication links, which are part of a communication system that includes a plurality of the communication links, and to decode data content carried by the one or more communication links; and a processor, which is arranged to compute first and second fingerprints related to the one or more communication links by evaluating statistical characteristics of the data content decoded from the one or more communication links, to compare the first and second fingerprints to produce a matching result, and to perform a predefined action with respect to the one or more communication links responsively to the matching result.

There is further provided, in accordance with an embodiment of the present invention, a computer software product used in a communication monitoring system, the product including a computer-readable medium, in which program instructions are stored, which instructions, when read by a processor, cause the processor to intercept one or more communication links, which are part of a communication system that includes a plurality of the communication links, to decode data content carried by the one or more communication links, to compute first and second fingerprints related to the one or more communication links by evaluating statistical characteristics of the data content decoded from the one or more communication links, to compare the first and second fingerprints to produce a matching result, and to perform a predefined action with respect to the one or more communication links responsively to the matching result.

The present invention will be more fully understood from the following detailed description of the embodiments thereof, taken together with the drawings in which:

DETAILED DESCRIPTION OF EMBODIMENTS

Overview

Figure 1A:
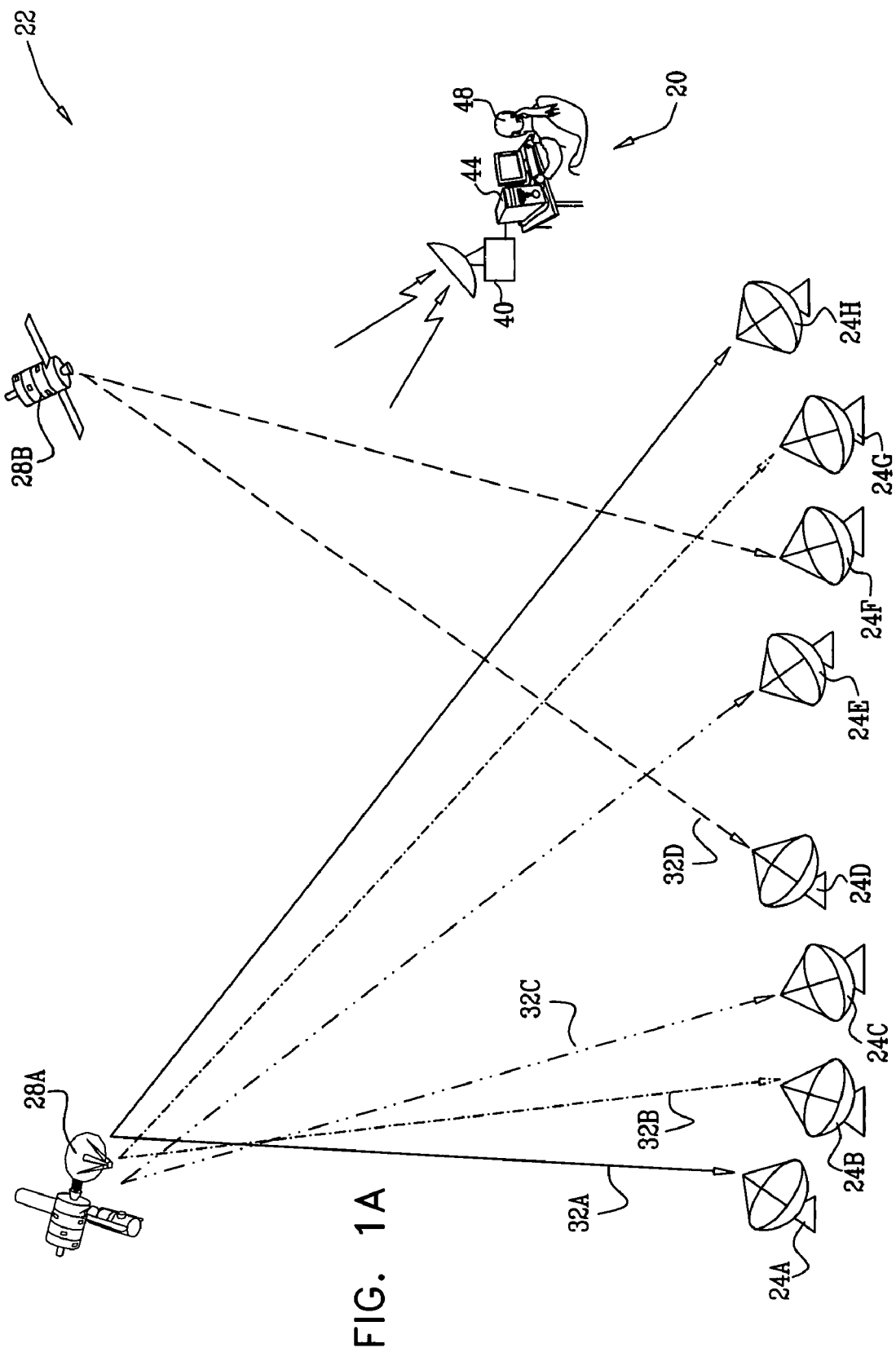
FIGS. 1A and 1B are block diagrams that schematically illustrate a system for intercepting communication links, in accordance with an embodiment of the present invention.

Intercepting communication links in a communication system often involves identifying or tracking a particular link within a large number of possible communication links in the system. For example, the intercepted link may switch to a different communication resource, e.g., change its frequency or switch to a different satellite. In other cases, only one direction of a bidirectional link is intercepted, and it is desired to identify the opposite direction from among a large number of possible links. Another scenario of link identification occurs when a certain communication connection transmits data in parallel over two or more links, e.g., for redundancy or load balancing. In such a scenario it is sometimes desired to identify one of the parallel links, given the interception of another parallel link. In yet other scenarios, it is desirable to automatically detect a material change in the operating characteristics of a link, and to act upon the detected change, such as by alerting an operator.

Embodiments of the present invention provide automated methods and systems for intercepting, identifying and tracking communication links in a communication system. The methods and systems described herein perform these tasks by characterizing and representing the intercepted links using mathematical signatures, which are referred to herein as fingerprints.

In some embodiments, an interception system intercepts a communication link of interest, extracts a set of link characteristics, and uses the characteristics to construct a link fingerprint. The link characteristics used for constructing the fingerprint may comprise, for example, the bandwidth utilized by the link, the distribution of the applications or services carried by the link, the IP addresses and subnets that appear in the packets carried by the link, the distribution of packet sizes, the characteristic network latency experienced by the link, the e-mail address domains that appear in the data carried by the link, the link quality (e.g., noise level and/or error rate), the distribution of traffic volume over time and/or any other suitable characteristics of the link. The fingerprint may also consider the variation of any of these characteristics over time, e.g., the daily, weekly or monthly behavior of the characteristics.

Having generated the link fingerprint, the interception system can track the link, or find another link having similar characteristics, by comparing the fingerprint to any number of candidate links in the system. Using the fingerprint, the interception system is able to automatically detect that a link ceased to operate or switched to a different resource, and then rapidly identify the new resource and re-intercept the link. By comparing fingerprints, the system is also able to identify and associate opposite direction links and parallel links of a given connection. Furthermore, the interception system is able to detect changes that occur in the operation or characteristics of the link, by detecting corresponding changes in the fingerprint that occur over time.

The methods and systems described herein can be used to perform various other types of link tracking and identification tasks. For example, the methods described herein can be used off-line, to identify a link that matches a given fingerprint in a body of pre-recorded interception data. The methods described herein can also be used for profiling the entity that operates the link.

Unlike manual link tracking and identification methods that are currently in use, the automated methods and systems described herein enable the interception system to perform link identification and tracking tasks rapidly, reliably and with little or no human intervention. For example, when a link switches to a different resource (e.g., different satellite or frequency channel), the change can be detected, the new resource identified and the link re-acquired within minutes or less. The automated methods described herein significantly improve the cost-efficiency of link interception. Moreover, these methods reduce the operating cost and increase the capacity of a given interception system, by reducing the amount of human involvement in the different interception processes.

System Description

Figure 1B:
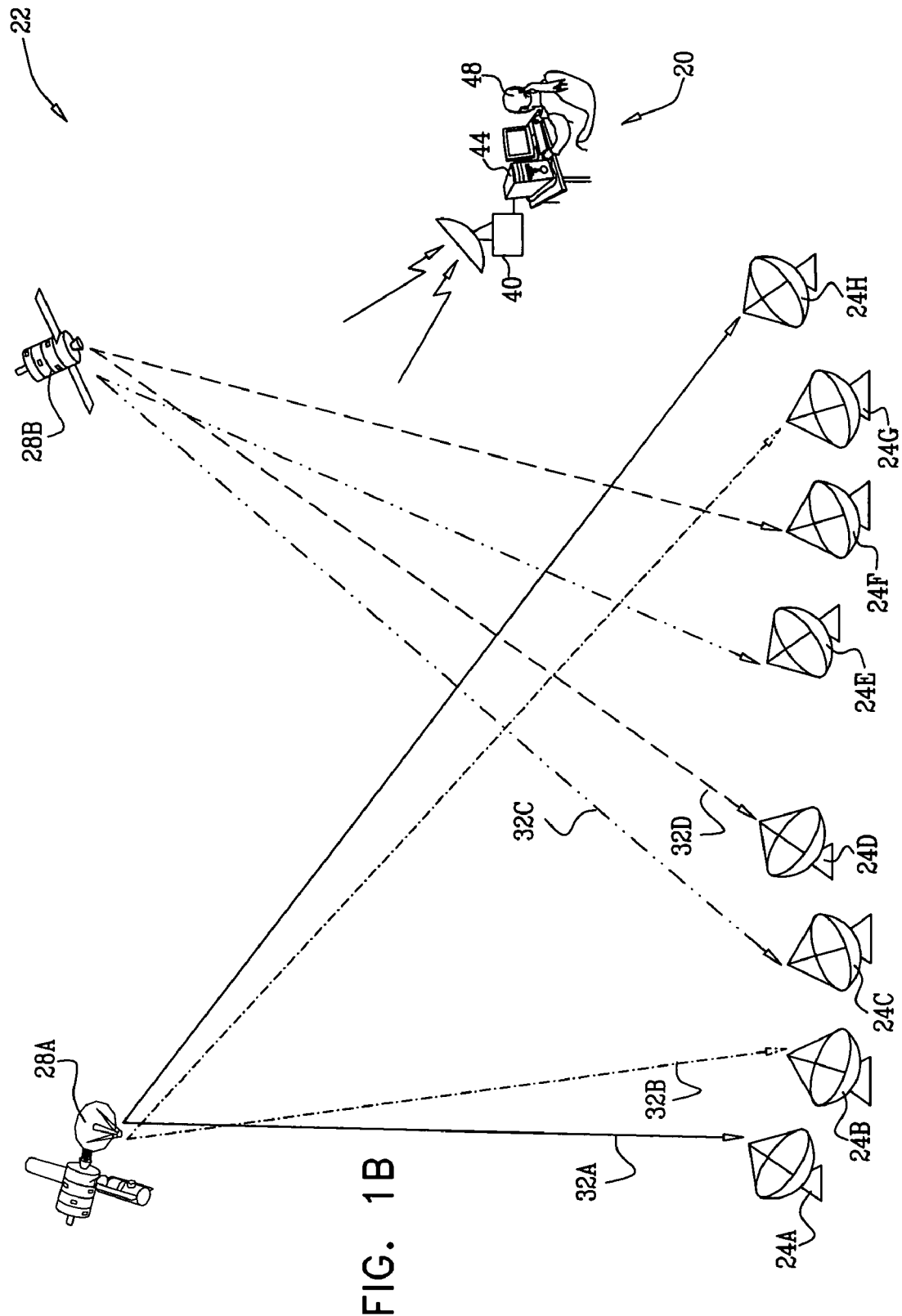

FIGS. 1A and 1B are block diagrams that schematically illustrate an interception system 20, which intercepts communication links that belong to a communication system 22, in accordance with an embodiment of the present invention. In the exemplary embodiment of FIGS. 1A and 1B, communication system 22 comprises a satellite communication system. In alternative embodiments, the methods and systems described herein can be used in various other types of wireless and wireline communication systems, such as, for example, cellular networks, trunked radio systems, wireline telephone networks, data communication networks such as Internet Protocol (IP) networks, wireless data networks such as Wireless Local Area Networks (LAN) or WiMAX™ networks, and/or any other suitable type of communication system.

Terminals 24A ... 24H of system 22 communicate with one another via satellites 28A and 28B, using communication links 32A ... 32D. In the present example, link 32A connects terminals 24A and 24H, link 32B connects terminals 24B and 24G, link 32C connects terminals 24C and 24E, and link 32D connects terminals 24D and 24F. Terminals 24A ... 24H are also referred to as the endpoints of their respective links. The communication links of system 22 carry data, which may be transferred in packet form, in streaming form or in any other form, using any suitable communication protocol or standard.

Typically, system 22 comprises a very large number of links, and system 20 intercepts only a selected subset of the links. In many cases, system 22 is able to intercept only a small fraction of the total number of links, due to the finite interception resources and the cost associated with intercepting and analyzing each link. Thus, system 20 typically selects and intercepts a subset of the links, in accordance with a certain prioritization, policy or criterion.

The endpoints in system 22 may serve entities such as individual persons, groups of persons, entire organizations or any other entity. Thus, a particular communication link in system 22 may sometimes serve multiple clients. For example, a particular endpoint may be connected locally to a number of clients using a local area network or other connection means. Generally, the traffic exchanged over the communication links may comprise data that belongs to multiple clients, applications, services, sources and destinations.

Although the communication links shown in FIGS. 1A and 1B are point-to-point links that connect two endpoints, system 22 may comprise links that connect more than two endpoints, such as point-to-multipoint or multipoint-to-multipoint links. Additionally or alternatively, in some cases two or more communication links may share a single resource. For example, in a wireline network, two or more links may be multiplexed and transported over a single physical trunk. In these cases, interception system 20 may intercept only one of these links, a subset of the links or even all links that share the resource.

The links in system 22 may be unidirectional, bidirectional or a mixture of unidirectional and bidirectional links. Some aspects of identifying unidirectional links having opposite directions that serve a single entity are described further below.

Interception system 20 intercepts some or all of the communication links of communication system 22, in order to receive, extract and analyze the data carried by the links. System 20 is typically operated by an organization such as a government agency or an intelligence organization. In some cases, interception system 20 is operated by a communication service provider, such as the service provider that operates system 22, either for internal purposes or for providing information to a third party.

Interception system 22 comprises a receiver 40, which receives the communication links and decodes the data content transmitted over the links. The decoded data content is provided to an interception processor 44, which performs the information extraction and analysis functions of the system. In particular, processor 44 carries out the fingerprint generation and associated link characterization, identification, profiling and/or tracking methods described herein. In some embodiments, a user 48 operates system 20. For example, the user may in some cases assist the automated link identification process, and/or receive alerts that indicate changes in the characteristics of the intercepted links.

Receiver 40 receives communication links of system 22 by monitoring communication resource of system 22 that are used by the links. The type of resources that are monitored by receiver 40 will typically vary with the nature of system 22. In the context of the present patent application and in the claims, the term "resource" is used broadly to describe any physical or logical resource of system 22 that is used to transmit or otherwise convey the monitored communication link.

For example, when system 22 comprises a satellite communication system as in FIG. 1A, the monitored resources may comprise certain satellites, satellite transponders or specific frequency channels within a given transponder. When system 22 comprises a land-based wireless network, the monitored resources may comprise certain base stations or frequency channels.

In some embodiments, the monitored resources may comprise certain communication trunks, such as T1 or E1 trunks, which are used to carry the communication link. The resource may comprise a physical channel, such as an optical fiber or copper line. Alternatively, the monitored resource may comprise a logical resource, such as a particular port number. Other types of logical resources can also be used. For example, when system 22 comprises an Internet Protocol (IP) network, the monitored resource may comprise a particular Virtual Private Network (VPN) or a particular Virtual Local Area Network (VLAN) that is used to transport the monitored communication link.

In some cases, the IP network uses tunnel-based routing protocols such as the Multi-Protocol Label Switching (MPLS) protocol, in which communication links are transported over virtual routing paths, also referred to as tunnels. In these cases, the monitored resource may comprise a particular virtual tunnel. In MPLS, for example, the tunnel comprises a Label-Switched Path (LSP), whose packets are assigned a particular MPLS label.

Further alternatively, the monitored resource may comprise a particular Time-Division-Multiplexing (TDM) slot allocation within a certain physical trunk. In some cases, although system 22 comprises a wireless communication system, the interception system monitors wireline channels, such as backhaul or backbone links, which are part of the communication system. The monitored resources may also comprise microwave or millimeter-wave point-to-point links that is part of system 22.

Depending on the nature of the monitored resources, receiver 40 may comprise a wireless receiver coupled to a suitable antenna, or a wireline interface coupled to the monitored communication system. For example, when the monitored system comprises a satellite communication system, receiver 40 may comprise a suitable satellite receiver and a suitable antenna that is pointed toward the desired satellite. In some embodiments, the monitored resource can be physically tapped. For example, Net Optics Inc. (Santa Clara, Calif.), produces various passive tapping devices for communication networks, which can be used for this purpose. Information regarding these tapping devices can be found at www.netoptics.com. Further alternatively, network elements such as switches and routers can be configured to divert or send copies of data packets to interception system 20. Such methods are commonly referred to as port spanning or port mirroring and are well known in the art.

As yet another example, Verint Systems Inc. offers a number of interception solutions, called StarGate, Vantage and Reliant. Details regarding these products can be found at www.verint.com/communications_interception. Alternatively, system 20 may use any other suitable wireless or wireline equipment, and any other suitable interception method, to implement receiver 40. The methods and systems described herein can be used with any type of receiver that is capable of receiving communication links of system 22 by monitoring the resources of the system.

Typically, interception processor 44 comprises a general-purpose computer, which is programmed in software to carry out the functions described herein. The software may be downloaded to the computer in electronic form, over a network, for example, or it may alternatively be supplied to the computer on tangible media, such as CD-ROM. Processor 44 may also be implemented using hardware, or using a combination of hardware and software elements.

Link Identification and Tracking

Occasionally, a communication link that is intercepted by system 20 may switch to a different resource. In the exemplary embodiment in which system 22 comprises a satellite communication system, the link may be reconfigured to use a different satellite, a different transponder in the same satellite, or a different frequency channel in the same transponder. In other types of communication systems, the link may switch to a different frequency or to a different physical channel or trunk, as applicable. Additionally or alternatively, the link may switch to a different logical resource. For example, the link may switch to a different slot allocation in the same physical trunk. As another example, the link can switch to a different port, slot allocation, VPN or VLAN.

Compare, for example, the link configuration of FIG. 1A to the configuration of FIG. 1B. FIG. 1A corresponds to a certain point in time, in which links 32A, 32B and 32C are relayed by satellite 28A, while link 32D is relayed by satellite 28B. FIG. 1B shows the configuration at a later point in time with respect to FIG. 1A. In FIG. 1B, link 32C is reconfigured and is now relayed by satellite 28B. Links 32A, 32B and 32D are unchanged.

When using manual link interception, hours or even days may pass before an operator detects that link 32C is no longer relayed by satellite 28A. Once the disappearance of the link is detected, a manual search process would be initiated, in order to scan the possible satellites, transponders and frequencies to which the link may have switched. This manual process is typically tedious, lengthy and susceptible to human errors. The overall process of manually re-acquiring a reconfigured link may take hours or days, may involve intensive human effort and often causes considerable loss of data.

Unlike the manual methods outlined above, the methods and systems described herein enable interception system 20 to automatically detect the fact that a certain intercepted link stopped using its current communication resource, and to identify the new resource to which the link switched. In some embodiments, the process is fully automatic and can be completed in minutes. In many cases, increasing the time period over which the link characteristics are collected increases the accuracy and reliability of the fingerprint. Therefore, the accuracy and reliability of the automatic detection process can often be improved by extending the monitoring time, e.g., to several hours.

Figure 2:
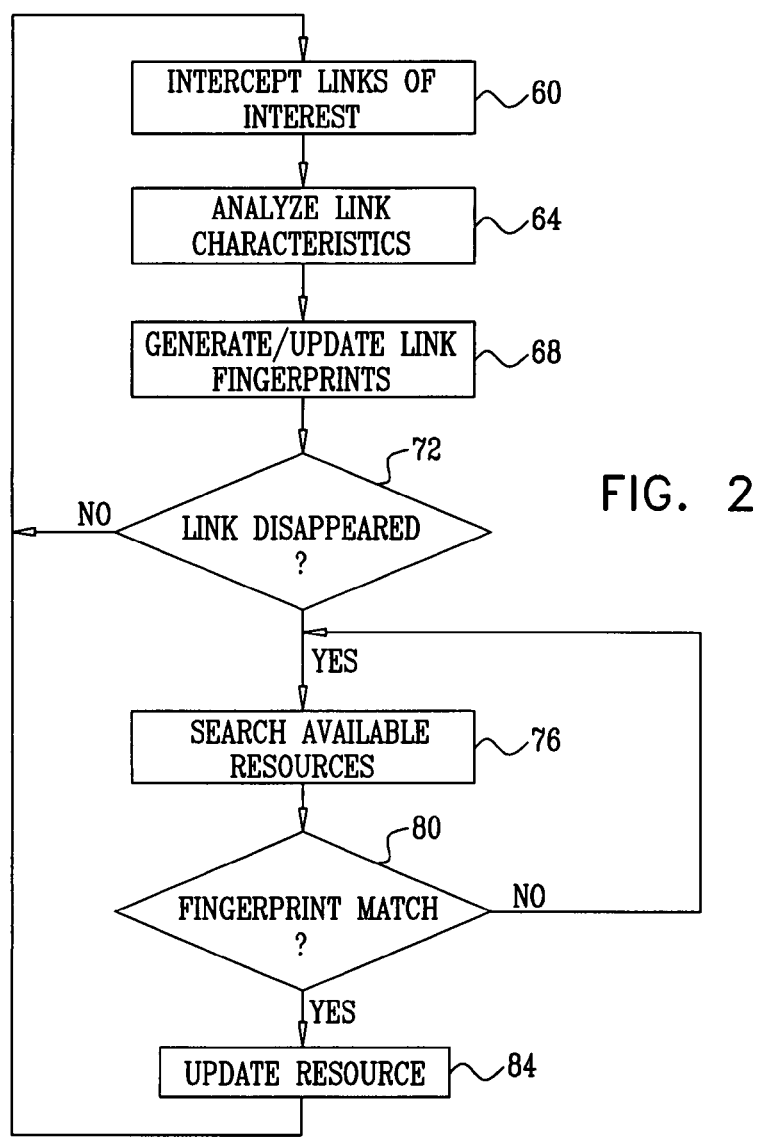
FIG. 2 is a flow chart that schematically illustrates a method for tracking communication links using link fingerprints, in accordance with embodiments of the present invention.

FIG. 2 is a flow chart that schematically illustrates a method for tracking communication links using link fingerprints, in accordance with an embodiment of the present invention. The method begins with receiver 40 intercepting one or more communication links of interest, at an interception step 60. Receiver 40 intercepts the links by monitoring the communication resources of system 22 that are used by the links, as explained above. Typically, processor 44 maintains a list of associations between the links of interest and the communication resources they use.

Interception processor 44 extracts the data carried by the intercepted links. The interception processor may perform any desired action on the extracted data, such as forwarding the data to a user or to another system, analyzing the data and/or storing the data for later retrieval.

Interception processor 44 extracts characteristics of the intercepted links, at a feature extraction step 64. The interception processor then generates link fingerprints (and/or updates existing fingerprints) using the extracted characteristics, at a fingerprint generation step 68. Since each link in system 22 is typically preconfigured to serve a certain entity (e.g., a group of persons or an organization), the link fingerprint can be viewed as a means for identifying and tracking the entity or entities served by the link.

Processor 44 may use various characteristics to construct the fingerprint. The characteristics may comprise, for example, general or aggregated attributes of the link, such as the bandwidth utilized by the link, the latency experienced by the link, the average packet size or distribution of packet sizes, the link quality (e.g., noise level or error rate) and/or any other general link attribute.

Other characteristics may relate to the information or data content carried by the link. In the context of the present patent application and in the claims, characteristics related to data content may comprise any type of characterization of the link, which can be derived from the data that was decoded from the signals transmitted over the link. The term "content-related characteristics" is meant to describe characteristics that are not directly connected to any signal-related or channel-related communication properties of the link.

Content-related characteristics can be derived from the content of any part of the data transmitted over the link, such as from user data, management data, IP headers, signaling and control fields or any other data type. For example, the distribution of the applications or services carried by the link can be used as characteristics. Some content-related characteristics may relate to the identities of the users of the link. Such identity-related characteristics may comprise, for example, IP addresses and subnets that appear in the packets carried by the link, e-mail addresses or domains that appear in the data carried by the link, chat nicknames and/or any other identity-related feature.

In some cases, the variation or distribution of some of the extracted characteristics over time can also be used as part of the link fingerprint. For example, the peak hour analysis, i.e., the time of day in which the link uses the most bandwidth, can be used as a characteristic feature. Other characteristics may comprise the daily, weekly or monthly variation of attributes such as the amount of use of a particular application or service, the appearance of a certain e-mail domain or IP address, or the temporal variation of any other link attribute.

Extracting the characteristics of a particular link in order to generate or update its fingerprint involves receiving and decoding the data transferred over the link for a certain time duration. The time duration may vary considerably, depending on the number of links, the type of links involved, the type and complexity of the characteristics and the fingerprint, and the desired level of accuracy and reliability of the fingerprint. Any time duration ranging from several seconds and up to many hours may be feasible in some scenarios.

For example, in some embodiments the fingerprints are based on data that is monitored over several days. Since in many cases the link characteristics vary over the day and/or week, the monitoring time period is selected so that the fingerprint reflects the normal time variation of the link characteristics. These normal variations should not trigger false alarms, i.e., they should not be interpreted as abnormal changes in the link behavior.

When multiple links are intercepted concurrently, it may be advantageous to reduce the time duration spent on extracting the characteristics of each link, even at the expense of somewhat reduced performance, in order to remain within the available resources of receiver 40 and processor 44.

In some embodiments, the characteristics of each intercepted link are extracted and updated occasionally, often at periodic intervals, in order to maintain an up-to-date fingerprint and to be able to detect changes in the link as soon as they occur.

The link fingerprints are typically represented as vectors, whose elements comprise a certain set of link characteristics. The vector may comprise scalar characteristics (single values) such as the link bandwidth, the number of peak hour call attempts, the number of emails exchanged per hour, application distribution percentages, the average number of Transmission Control Protocol (TCP) retransmissions per second, or any other numerical characteristic. In some cases, a particular characteristic may by itself comprise a vector, an array or other data structure. The data structure may comprise numerical data, textual data, Boolean flags and/or any other data type. For example, a certain element of the fingerprint vector may comprise a list of the most commonly-used e-mail domains, the most commonly-used IP subnets, or any other suitable set of values.

The fingerprints of two communication links can be compared to one another, in order to quantify the similarity between the characteristics of the two links. When the fingerprints are represented using vectors of values, processor 44 typically compares two fingerprints by determining a distance vector, whose elements indicate the dissimilarity between the corresponding elements of the two fingerprints. For example, the dissimilarity between two numerical values may comprise the arithmetic difference between them, the absolute value of the difference, a square of the difference or a weighted difference in accordance with a certain weighting function or set of weights.

The dissimilarity between lists of textual items or other data types can be calculated using any suitable method or metric. For example the dissimilarity between two lists of textual items may comprise the number of non-matching items in the two lists, regardless of their location in the lists.

In some embodiments, processor 44 converts the distance vector to a single distance value, which quantifies the difference between the two compared fingerprints. For example, the distance value may comprise a weighted sum of the elements of the distance vector. In alternative embodiments, the distance value may indicate the amount of similarity, or matching, between the two links.

The weights used for defining the distance between numerical characteristics, as well as the weights used for converting the distance vector to a single distance value, may be tuned manually or automatically. Automatic tuning of the weights can be carried out using any suitable learning process known in the art. Processor 44 typically matches the two fingerprints by comparing the single distance value to a user-defined threshold. If the distance is smaller than the threshold, the two fingerprints are considered to match one another with high probability.

Interception processor 44 checks whether one or more of the intercepted links stopped using the communication resource it was known to use, at a disappearance checking step 72. In some embodiments, the interception processor checks whether the fingerprint evaluated at step 68 above is substantially different from previous fingerprints of the same link. Processor 44 may store and maintain a list of previously-evaluated fingerprints of the intercepted links, which serve as baseline or reference fingerprints for comparison. The amount of tolerable difference between the baseline fingerprints and the current fingerprints can be preset, such as using a parametric threshold.

Alternatively, processor 44 may determine that a certain link has disappeared by detecting a lack of activity on the monitored resource, or using any other suitable detection method or criterion.

As long as the intercepted links continue to use the same communication resources (e.g., as long as the currently-evaluated fingerprints are sufficiently similar to the baseline fingerprints), the method loops back to interception step 60 above, and system 20 continues to intercept the links of interest.

If processor 44 determines, at step 72 above, that a particular intercepted link has stopped using the resource it was known to use, the processor concludes that the link may have switched to a different resource. In some embodiments, system 20 may trigger an alert, or otherwise indicate to operator 48 that a link has disappeared and has potentially switched to a different resource.

System 20 searches the available resources in an attempt to re-acquire the link, at a re-acquisition searching step 76. Receiver 40 searches the range of resources it is able to monitor. At each searched resource, processor 44 extracts the link characteristics, evaluates the link fingerprint, and compares the evaluated fingerprint to the known fingerprint of the missing link (e.g., the baseline fingerprint stored by processor 44).

When the fingerprint evaluated at one of the searched resources matches the known fingerprint of the missing link, processor 44 associates the newly-found resource with the missing link, at a resource updating step 84. The method loops back to interception step 60 above, and system 20 continues to intercept the links of interest. In particular, the system intercepts the link that changed its resource at its newly-found location.

The decisions carried out during the process described above can be carried out fully-automatically, or in an operator-assisted manner. For example, at step 72 above, processor 44 may first alert the operator to the fact that a certain link stopped using its presently-known resource. In this exemplary process, the operator would verify the automatic detection and, if appropriate, would instruct processor 44 to begin searching for the new resource. The operator may also be involved in the identification of the new resource. For example, processor 44 may present the new resource it had identified, or a list of candidate resources, to the operator. The operator would then approve, reject or modify the automated selection. In particular, the user can manually select a resource that is different from the resource suggested by processor 44, if he or she believes the automatic matching result is wrong.

Additionally or alternatively to tracking communication links that switch resources, interception system 20 can also use link fingerprints to detect changes in the behavior pattern or operating characteristics of the intercepted communication links.

Figure 3:
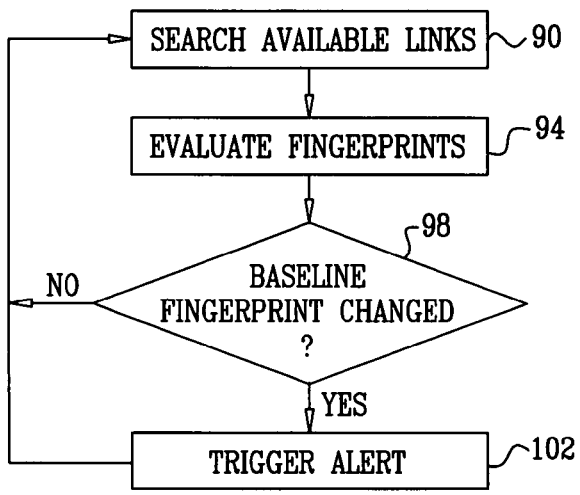
FIG. 3 is a flow chart that schematically illustrates a method for detecting changes in communication links using link fingerprints, in accordance with another embodiment of the present invention.

FIG. 3 is a flow chart that schematically illustrates a method for detecting changes in communication links using link fingerprints, in accordance with an embodiment of the present invention. The method begins with system 20 searching and intercepting the available communication links, at a link searching step 90. Processor 44 evaluates the fingerprint of each link, at a fingerprint evaluation step 94. The interception processor compares each currently-evaluated fingerprint to a baseline fingerprint of the link, at a baseline comparison step 98. If the currently-evaluated fingerprint differs from the baseline fingerprint, according to a predetermined criterion, processor 44 concludes that a material change in the link characteristics or operation has occurred. Processor 44 triggers an alert to the operator, or takes any other suitable action, at an alerting step 102.

In carrying out the method of FIG. 3, processor 44 may represent the link fingerprints as vectors of characteristic values or using any other suitable representation. The interception processor may use any suitable method for quantifying the distance or similarity between fingerprints, such as the methods described above.

Changes in link operation that can be detected may comprise, for example, a link that ceased to operate or switched to another communication resource, a change in the entities served by the link (e.g., a change in e-mail domains or IP addresses that appear in the link), changes in the temporal behavior of the link, and/or any other change in link characteristics or their time-dependent patterns.

Further additionally or alternatively, the interception system can use the link fingerprints to identify a link that is not yet intercepted, but is related to a certain intercepted link. For example, consider two endpoints that communicate over two unidirectional links having opposite directions. In some cases, one unidirectional link is already intercepted by system 20, but the opposite link is not yet identified. Assuming the fingerprints of the two opposite links are related to one another, system 20 can use the known fingerprint of one link in order to identify the other. For example, system 20 can scan the available candidate links, evaluate their fingerprints and compare the fingerprints to the known fingerprint of the intercepted unidirectional link. When a link having the opposite direction and a matching fingerprint is found, the matching link is declared as the sought opposite link.

In some communication systems, the traffic between two endpoints is sometimes sent over two or more parallel communication links. Parallel links are used, for example, in order to provide communication diversity and protection to the traffic. In different configurations, data can be divided among the parallel links and/or duplicated and sent in parallel. In some cases, one parallel link may already be intercepted by system 20, while another parallel link may not yet be identified. In such cases, assuming the fingerprints of parallel links are related to one another, system 20 can use the known fingerprint of one parallel link in order to identify another parallel link.

Note that when in order to identify a link that is related to a previously-intercepted link, the fingerprints of the two links need not necessarily be identical or even similar, but only related to one another in some respects. For example, the presence of a particular e-mail domain or other characteristic in both fingerprints may sometimes be sufficient for identifying the links as opposite or parallel links, even though the links may differ from one another considerably in other respects. As noted above, the similarity or dissimilarity between two fingerprints is typically expressed using distance vectors and values that are based on various criteria. The decision whether two links are related to one another can be based on an application-specific threshold.

The methods described herein can also be used for identifying opposite links and parallel links, as well as for detecting changes in link behavior, in an off-line manner. For example, processor 44 can search a body of previously-recorded interception data, and compare this data to a certain target fingerprint.

Although the embodiments described herein mainly address identifying and tracking communication links using fingerprints, the principles of the present invention can also be used for performing other interception tasks, such as for link profiling. In such embodiments, the link fingerprint is used to characterize the entity that operates the link. For example, the methods and systems described herein can be used to determine whether the organization that operates the link is an administrative organization, a research and development organization, a government organization or any other desired type of entity, based on the link characteristics. Typically, fingerprints that are indicative of certain types of organizations are constructed a-priori, and the characteristics of the monitored link are compared with these fingerprints. Fingerprint-based link profiling can also be used to detect, for example, that the organization operating the link grew or shrank in size. Link profiling can also determine whether two monitored links originate from the same territory or serve the same organization.

The methods and systems described herein can also be used in other communication monitoring applications, such as performance evaluation and health and statistics monitoring of communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A communication monitoring apparatus, comprising:
   a receiver, which is arranged to intercept one or more communication links, which are part of a communication system that includes a plurality of the communication links, and to decode data content carried by the one or more communication links; and
   a processor, which is arranged to compute first and second fingerprints related to the one or more communication links by evaluating statistical characteristics of the data content decoded from the one or more communication links, to compare the first and second fingerprints to produce a matching result, and to perform a predefined action with respect to the one or more communication links responsively to the matching result, wherein the receiver is arranged to monitor first and second resources of the communication system used by respective first and second communication links during respective first and second different time intervals, and wherein the processor is arranged to compute the first and second fingerprints by evaluating respective first and second statistical characteristics of first and second data content decoded from the first and second communication links during the first and second time intervals, and to detect that the first communication link switched from the first resource to the second resource between the first time interval and the second time interval to form the second communication link by comparing the first and second fingerprints, and wherein the receiver is arranged to continue intercepting the second communication link by monitoring the second resource.

2. The apparatus according to claim 1, wherein the receiver is arranged to intercept the one or more communication links by monitoring a resource of the communication system, and wherein the processor is arranged to compute the first and second fingerprints by evaluating respective first and second statistical characteristics of first and second data content decoded from the communication link during first and second different time intervals, and to automatically detect that the communication link stopped using the monitored resource during the second time interval by comparing the first and second fingerprints.

3. The apparatus according to claim 1, wherein the receiver is arranged to intercept the one or more communication links by monitoring at least one physical resource of the communication system selected from a group of physical resource types consisting of a satellite, a satellite transponder, a base station, a frequency channel, a trunk, an optical fiber, a wire connection and a wireless point-to-point link.

4. The apparatus according to claim 1, wherein the receiver is arranged to intercept the one or more communication links by monitoring at least one logical resource of the communication system selected from a group of logical resource types consisting of a port, a slot allocation in a physical trunk, a Virtual Private Network (VPN) a Virtual Local Area Network (VLAN) and a routing path.

5. The apparatus according to claim 1, wherein the receiver and the processor are arranged to intercept a first communication link, to compute the first fingerprint by evaluating the statistical characteristics of the data content decoded from the first communication link, to search the plurality of the communication links and to identify a second communication link that is related to the first communication link.

6. The apparatus according to claim 5, wherein the first and second communication links comprise respective first and second opposite directions of a bidirectional communication link.

7. The apparatus according to claim 5, wherein the first and second communication links comprise parallel links that transfer data of a single communication connection over different communication resources.

8. The apparatus according to claim 1, wherein the processor is arranged to evaluate the first and second fingerprints at respective first and second different points in time, and to detect a change in the communication links that occurred between the first and second points in time by comparing the first and second fingerprints.

9. The apparatus according to claim 1, wherein the second fingerprint value represents a predefined link profile, and wherein the processor is arranged to determine whether the intercepted communication links match the predefined link profile by comparing the first and second fingerprints.

10. The apparatus according to claim 9, wherein the predefined link profile characterizes an entity that operates the intercepted communication links.

11. The apparatus according to claim 1, wherein the processor is arranged to store the data content exchanged over the intercepted communication links, and to compute the first and second fingerprints by processing the stored data content.

12. The apparatus according to claim 1, wherein the predefined action comprises triggering an alert to a user.

13. The apparatus according to claim 1, wherein the processor is arranged to quantify a similarity between the first and second fingerprints.

14. The apparatus according to claim 13, wherein the processor is arranged to compare the quantified similarity to a threshold.

15. The apparatus according to claim 13, wherein the first and second fingerprints comprise respective first and second vectors whose elements comprise first and second values of the statistical characteristics, and wherein the processor is arranged to quantify the similarity by calculating a distance metric between the first and second vectors.

16. The apparatus according to claim 15, wherein the processor is arranged to calculate a distance vector whose elements indicate similarities between the respective elements of the first and second vectors, and to process the elements of the distance vector to produce the distance metric.

17. The apparatus according to claim 16, wherein the processor is arranged to apply respective weights to the elements of the distance vector and to sum the weighted elements.

18. The apparatus according to claim 1, wherein the statistical characteristics comprise at least one characteristic type selected from a group of types consisting of performance attributes of the communication links, characteristics of applications served by the communication links and characteristics related to identities of users of the communication links.

19. The apparatus according to claim 1, wherein one of the statistical characteristics comprises a variation of another of the statistical characteristics over time.

* * * * *